United States Patent [19]

Koch et al.

[11] Patent Number: 5,094,009
[45] Date of Patent: Mar. 10, 1992

[54] GAUGE FOR MEASURING THE THICKNESS OF A COATING ON A SUBSTRATE

[75] Inventors: Frank J. Koch, Ogdensburg, N.Y.; Marlin S. Walmer, Lancaster, Pa.

[73] Assignee: DeFelsko Corporation, Ogdensburg, N.Y.

[21] Appl. No.: 599,101

[22] Filed: Oct. 17, 1990

[51] Int. Cl.$^5$ .............................................. G01B 7/00
[52] U.S. Cl. ...................................... 33/834; 324/230
[58] Field of Search ................. 33/834; 324/229, 230, 324/231

[56] References Cited

U.S. PATENT DOCUMENTS

| | | |
|---|---|---|
| 2,625,585 | 1/1953 | Krouse . |
| 2,749,505 | 6/1956 | McNary .............................. 324/230 |
| 3,761,804 | 9/1973 | Steingroever . |
| 3,901,741 | 8/1975 | Benz et al. . |
| 4,125,807 | 11/1978 | Steingroever . |
| 4,160,208 | 7/1979 | Steingroever et al. . |
| 4,211,585 | 7/1980 | Inomata et al. . |
| 4,226,620 | 10/1980 | Rothwarf et al. . |
| 4,392,305 | 7/1983 | Nix et al. .............................. 33/834 |
| 4,400,665 | 8/1983 | Nix . |
| 4,433,290 | 2/1984 | Koch . |
| 4,567,436 | 1/1986 | Koch . |
| 4,599,562 | 7/1986 | Koch . |
| 4,634,974 | 1/1987 | Hunter . |
| 4,692,700 | 9/1987 | Nix . |
| 4,733,178 | 3/1988 | Koch . |
| 5,006,799 | 4/1991 | Pfanstiehl . |

FOREIGN PATENT DOCUMENTS

| | | |
|---|---|---|
| 215169 | 5/1961 | Austria . |
| 3611798 | 6/1987 | Fed. Rep. of Germany . |
| 0590591 | 1/1978 | U.S.S.R. .............................. 33/834 |
| 799768 | 8/1958 | United Kingdom . |
| 907721 | 10/1962 | United Kingdom . |

OTHER PUBLICATIONS

PENTEST Coating Thickness Gage (drawing) by Elektro-Physik U.S.A., Inc.
Biddle Instruments, "Price List Bulletin 28," Nov. 1987.
The Snitch Manufacturing Co. advertisement for the SNITCH Body Filler Detector.
Goodman & Co. advertisement for electronic device for detecting plastic filler.
The Genius advertisement for FIFI (filler finder).

Primary Examiner—Harry N. Haroian
Attorney, Agent, or Firm—Burns, Doane, Swecker & Mathis

[57] ABSTRACT

A gauge for measuring the thickness of a coating on a substrate includes a housing, an indicator rod movably positioned within the housing, a magnet mounted on the forward end of the indicator rod, and a spring connected to the rearward end of the indicator rod. The housing can have a slot extending along a portion thereof that communicates with the interior of the housing. According to one embodiment, a measurement scale can be positioned adjacent to and extending along the length of the slot and a plurality of indicating marks can be provided on the rod for permitting the thickness of the coating to be determined. The particular indicating mark that is used for determining the thickness of the coating is dependent upon the orientation of the gauge relative to the force of gravity. According to another aspect of the present invention, the magnet can be fabricated from a combination of at least one light rare earth element and at least one heavy rare earth element.

28 Claims, 3 Drawing Sheets

GAUGE FOR MEASURING THE THICKNESS OF A COATING ON A SUBSTRATE

FIELD OF THE INVENTION

The present invention relates to a gauge for measuring the thickness of a coating on a substrate. More particularly, the present invention pertains to a gauge for measuring the thickness of a non-magnetic coating on a ferromagnetic substrate.

BACKGROUND OF THE INVENTION

Coating thickness measurement gauges of the magnetic type are used for measuring, in a non-destructive manner, the thickness of coatings placed on a ferromagnetic substrate. The operation of those gauges is based on the principle that the magnitude of the force of magnetic attraction between a ferromagnetic substrate and a magnet will vary depending upon the thickness of the coating which separates the magnet from the ferromagnetic substrate. The greater the thickness of the coating, the lesser the force of magnetic attraction.

Gauges of this type are used for measuring the thickness of coatings in many different coating processes such as, for example, plating, painting and enameling, metal spraying, welding, boiler-making and other areas where protective coatings are applied to an article. The magnetic type gauges are advantageous in that they permit the thickness of a coating to be quickly and easily determined in a non-destructive manner. Although the magnetic type gauges currently available are able to provide relatively accurate results in many instances, they do suffer from certain drawbacks.

One of these drawbacks relates to their susceptibility to drifting when used to measure the thickness of a coating on a substrate whose temperature is above or below room temperature, such as in the case of freshly hot dipped galvanized objects or powder coated articles emerging from melting ovens. Known coating thickness measurement gauges utilize rare earth alloy magnets of the SmCo$_5$ and Sm$_2$Co$_{17}$ type. It has been discovered that errors in coating thickness measurement on the order of four percent per 100° C. above or below room temperature can result when using such gauges which employ only light rare earth elements in combination with a transition element. The errors arise because the magnetic strength of the light rare earth magnet alloys varies with changes in temperature.

Since it is oftentimes necessary to determine the thickness of the coating as soon as possible after the coating has been applied, waiting until the substrate has reached room temperature is not a desirable alternative.

Accordingly, the need exists for a coating thickness measurement gauge that is able to provide accurate coating thickness measurements over a wide range of temperatures. Similarly, there exists a need for a gauge that permits the thickness of coatings to be measured immediately after the coating has been applied.

Another problem that arises concerns the inability of known coating thickness measurement gauges of the magnetic type to compensate for the affect that gravity has on the accuracy of the measurements obtained. For example, U.S. Pat. No. 4,392,305 discloses a gauge which employs a permanent magnet suspended on a coil spring within a housing. When such a gauge is utilized to measure the thickness of a coating on a vertical wall or some other vertically oriented member, gravity has little or no effect upon the operation of the gauge because the magnetic attraction force between the magnet and the ferromagnetic substrate is perpendicular to the force of gravity. However, when measuring the thickness of a coating on a horizontally oriented member, such as a coated member located on the ground or extending across the ceiling, the force of gravity acts parallel to the force of magnetic attraction, thereby giving inaccurate results. For example, when measuring the thickness of a coating on a floor, the force of gravity acts in the same direction as the force of gravity and consequently, the measured thickness of the coating will be less than the actual coating thickness.

There exists a need, therefore, for a coating thickness measurement gauge of the magnetic type that is able to compensate for the affect of gravity in order to produce accurate and reliable coating thickness measurements.

SUMMARY OF THE INVENTION

In accordance with one aspect of the present invention, there is provided a coating thickness measurement gauge that includes a housing having an interior, an indicator rod movably positioned within the interior of the housing, a probe assembly mounted on the indicator rod for providing a magnetic attraction force that urges the indicator rod toward the coating for contacting the probe assembly with the coating, and a measurement scale for denoting coating thickness based upon the amount of movement of the indicator rod. An indicating arrangement which cooperates with the measurement scale is also provided for indicating the thickness of the coating and for compensating for the affect that gravity has on the amount of force necessary to move the probe assembly out of engagement with the coating.

In accordance with a preferred embodiment of the present invention, the indicating arrangement includes first, second, and third indicating marks positioned on the indicating rod. The first indicating mark is utilized, in cooperation with the measurement scale, for determining the thickness of a coating when the force of magnetic attraction is substantially perpendicular to the direction of the force of gravity. The second indicating mark, which is spaced from the first indicating mark in the direction away from the probe assembly, is utilized, in cooperation with the measurement scale, for indicating the thickness of a coating when the force of magnetic attraction is substantially parallel to and in the same direction as the force of gravity. The third indicating mark, which is spaced from the first indicating mark in the direction toward the probe assembly, is utilized, in cooperation with the measurement scale, for reading the thickness of a coating when the force of magnetic attraction is substantially parallel to and in the direction opposite to the force of gravity.

In accordance with another aspect of the present invention, the coating thickness measurement gauge includes a housing having an interior, a rod movably positioned within the interior of the housing, a magnet mounted on one end of the rod for providing a magnetic attraction force urging the rod toward the coating due to the underlying ferromagnetic substrate, and a spring for providing a biasing force in opposition to the magnetic attraction force. The magnet is fabricated from a combination of at least one light rare earth element and at least one heavy rare earth element.

Preferably, the heavy rare earth element can be any one of or a combination of europium, gadolinium, terbium, dysprosium, holmium, erbium, thulium, ytterbium or lutetium. Also, the light rare earth element can be any one of or a combination of lanthanum, cerium, praseodymium, neodymium, promethium, or samarium.

BRIEF DESCRIPTION OF THE DRAWINGS

Preferred embodiments of the present invention will be described in greater detail with reference to the accompanying drawing figures, wherein like elements bear like reference numerals and wherein.

DETAILED DESCRIPTION OF THE PREFERRED EMBODIMENTS

Figure 1:
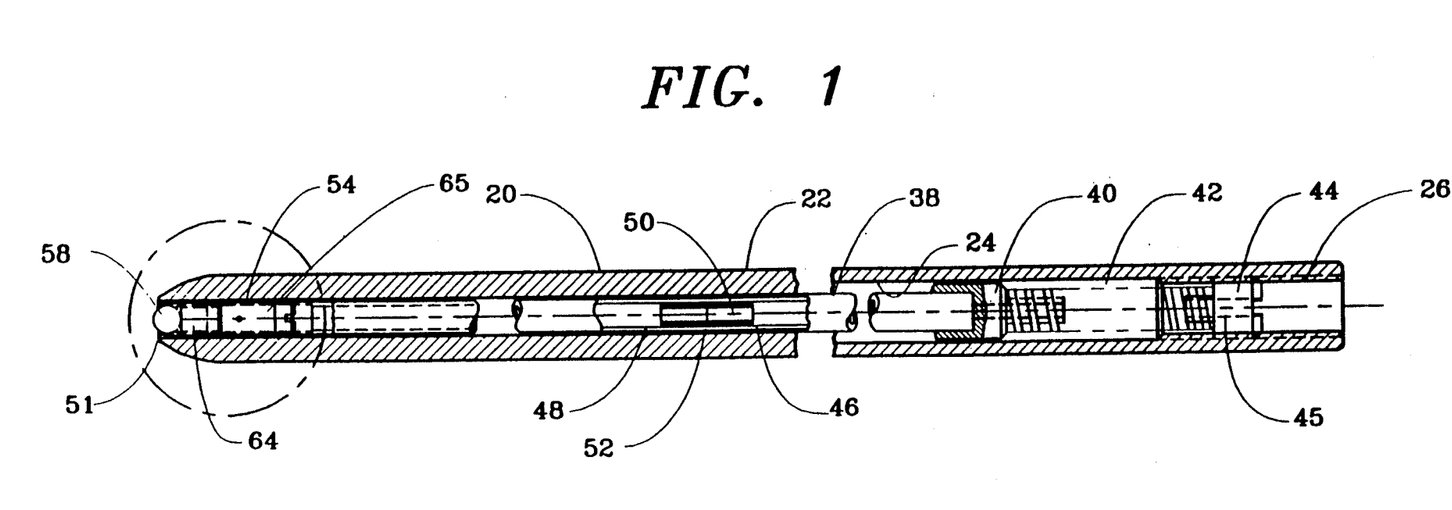
FIG. 1 is a longitudinal cross-sectional view of the gauge according to the present invention.

Turning initially to FIG. 1, the coating thickness measurement gauge 20 of the present invention includes an elongated tubular housing 22 which is generally in the shape of a pencil. A bore 24 extends completely through the housing 22 so that the housing 22 is open at opposite ends. The rearward end of the housing 22 (i.e., the end to the right as seen in FIG. 1) includes an internal thread 26.

Figure 4:
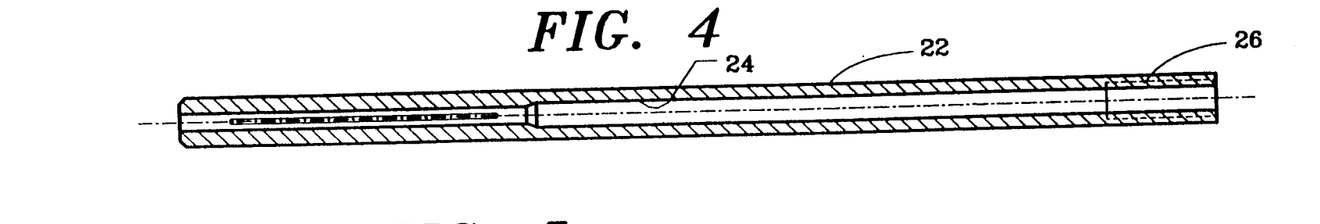
FIG. 4 is a cross-sectional view of the housing shown in FIG. 3 along the section line 4—4.

As seen in FIG. 4, the bore 24 that extends through the housing 22 includes a portion towards the rear of the housing 22 that is slightly larger in diameter than a portion of the bore located at the forward end of the housing 22.

Figure 3:
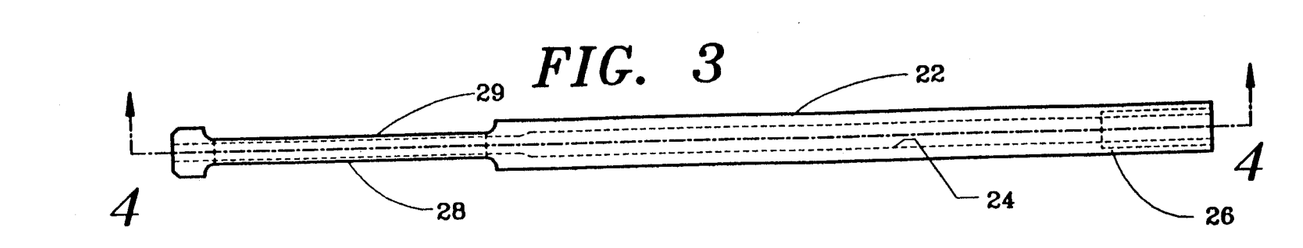
FIG. 3 is a top view of the housing which forms a part of the gauge according to the present invention.

As best seen in FIG. 3, oppositely positioned narrowed portions 28, 29 are formed on the housing 22 adjacent the forward end of the housing 22. A measurement scale 30 is provided on one side of the housing 22 in the narrowed portion 28. The measurement scale 30 includes numerical markings which represent thicknesses in thousandths of an inch (mils). The housing 22 also includes a slot 34 that extends along the length of the narrowed portion 28. The slot 34 communicates with the interior of the housing 22 and the measurement scale 30 extends along the length of the slot 34.

Figure 5:
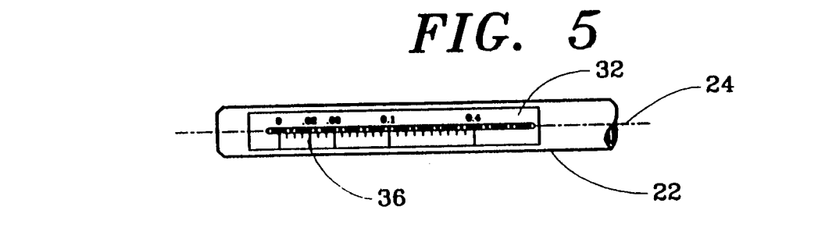
FIG. 5 is a right side view of the housing which forms a part of the gauge according to the present invention.

As seen in FIG. 5, another measurement scale 32 is positioned on the opposite side of the housing 22 from the measurement scale 30. The scale 32 extends along the length of the narrowed portion 29. The measurement scale 32 includes numerical markings which represent thicknesses in millimeters. A slot 36 extends along the narrowed portion 29 and communicates with the interior of the housing 22. The measurement scale 32 extends along the length of the slot 36 and the slots 34, 36 are positioned opposite to one another.

Turning back to FIG. 1, the gauge 20 further includes an elongated indicator rod 38 positioned within the tubular housing 22. A spring mounting member 40 is secured to the rear end of the indicator rod 38 in any suitable manner. A tension spring 42 is mounted on one end of the spring mounting member 40. The tension spring 42 exerts a biasing force on the indicator rod 38 in a direction toward the rear end of the housing 22 (i.e., toward the right as seen in FIG. 1).

An adjustment screw 44 is positioned within the tubular housing 22 adjacent the rear end of the housing 22. A bore 45 extends completely through the adjustment screw 44. The tension spring 42 is connected to the adjustment screw 44. The outer peripheral surface of the adjustment screw 44 is threaded for threadably engaging the internal thread 26 at the rear end of the housing 22. The adjustment screw 44 is preferably provided with a suitably configured end face for permitting a screwdriver or the like to rotate the adjustment screw 44 along the rear portion of the housing 22. The tension spring 42 is secured to the adjustment screw 44 and the spring mounting member 40 in such a manner that rotation of the adjustment screw 44 results in rotation of and longitudinal movement of the indicator rod 38.

As further seen in FIG. 1, the indicator rod 38 includes first and second tubular portions 46, 48 that are joined to one another by a tubular joining member 50. The first and second portions 46, 48 of the indicator rod may be differently colored in order to clearly identify the joining line 52. As will become apparent from the description below, the joining line 52 serves as an indicating mark for indicating the thickness of the coating being measured during operation of the gauge 20. Thus, it is preferable that the joining line 52 between the first and second tubular portions 46, 48 be clearly marked.

Figure 2:
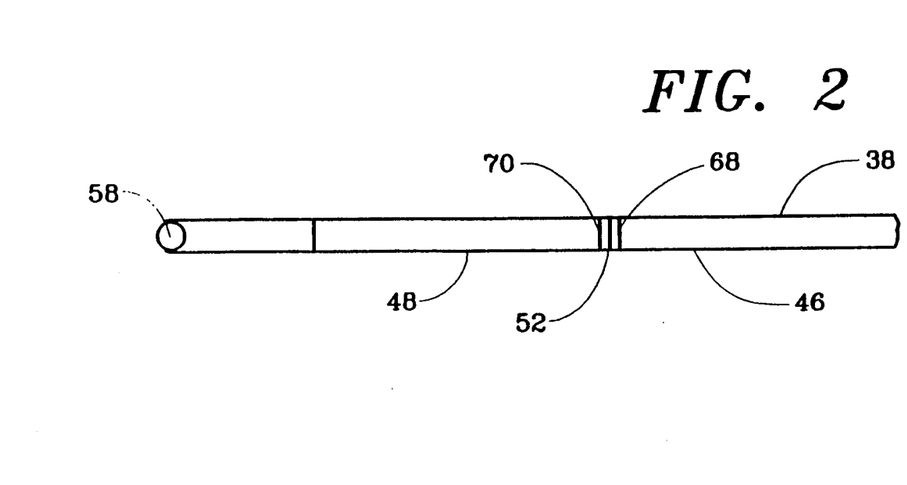
FIG. 2 is an enlarged side view of the indicator rod which forms a part of the gauge according to the present invention.

The indicator rod 38 that is utilized in the coating thickness measurement gauge of the present invention is specifically designed to take into account and compensate for the affect that the force of gravity has on the operation of the gauge 20. As seen in FIG. 2, in addition to the first indicating mark 52 defined by the joining line between the first and second tubular portions 46, 48 of the indicator rod 38, the indicator rod 38 also includes a second indicating mark 68 and a third indicating mark 70 located thereon. The second indicating mark 68 is positioned on the first portion 46 of the indicator rod 38 and is spaced from the first indicating mark 52 in a direction away from the forward end 51 of the housing 22. The third indicating mark 70 is positioned on the second portion 48 of the indicator rod 38 and is spaced from the first indicating mark 52 in a direction toward the forward end 51 of the housing 22. The second and third indicating marks 68, 70 are preferably spaced from the first indicating mark 5 by substantially equal distances.

As was noted above, the first and second tubular portions 46, 48 of the indicator rod 38 are preferably differently colored in order to result in a first indicating mark 52 that is clearly visible. Likewise, the second and third indicating marks 68, 70 should also be suitably marked so that they are readily visible to the user. For example, the second and third indicating marks 68, 70 can be marked by using differently colored fluorescent paint. As an alternative, the second and third indicating marks 68, 70 can be defined by colored grooves.

In order to make it easier to remember which indicator mark should be read during a given coating thickness measurement operation, the second indicating mark 68 may be colored green to signify that when the forward end 51 of the gauge is pointing downward (i.e., toward the grass) during a coating thickness measurement operation, the green indicating mark should be read. Similarly, the third indicating mark can be colored blue to signify that when the forward end 51 of the gauge is pointing upward (i.e., toward the sky) during a coating thickness measurement operation, the blue indicating mark should be read. The use of the first, second, and third indicating marks 52, 68, 70 and the manner in which they help compensate for the affect that the force of gravity has on the accuracy of the measurements will become apparent when the operation of the gauge is described below.

Figure 7:
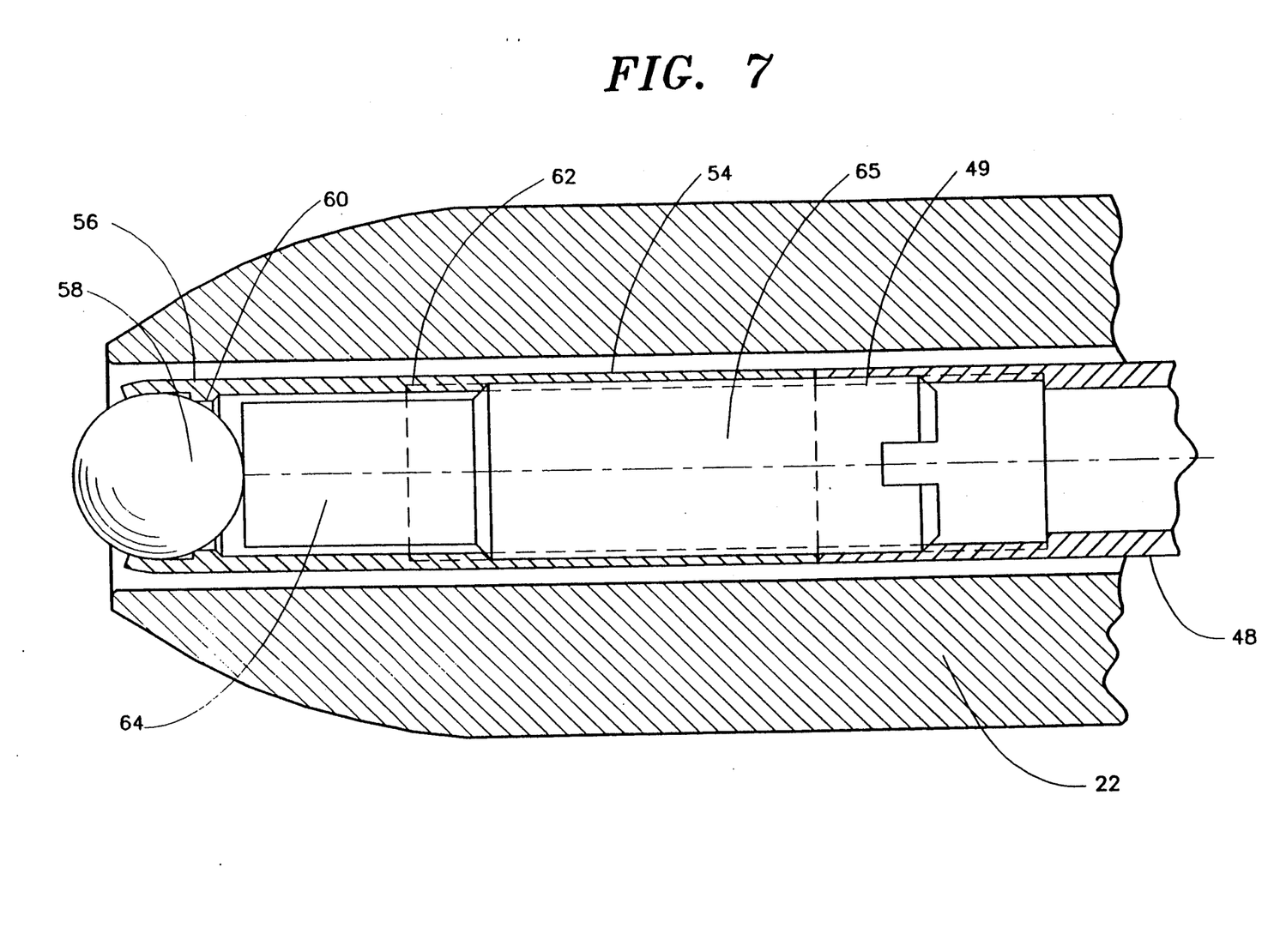
FIG. 7 is an enlarged cross-sectional view of the portion of the gauge shown in the dotted circle of FIG. 1.

Turning to FIG. 7, a probe assembly 54 is mounted at the forward end of the second portion 48 of the indicator rod 38. The probe assembly 54 includes a tubular casing 56 and a spherical contact member 58 mounted at the forward end of the casing 56. The casing 56 is preferably formed of a relatively non-magnetizable material such as brass. The rearward portion of the casing 56 is provided with an internal thread 62.

The contact member 58 may be a sphere of cemented carbide, possibly tungsten carbide, containing from about 5 to 30 weight percent cobalt (or equivalent metal) binder or a sphere of a particular alloy of aluminum, iron, and silicon commercially known as Alfesil (Low Wear Material). The contact member 58 is preferably spherical, primarily for economical reasons. By providing the contact member as a sphere, a desired spherical contact surface is provided so as to permit a point contact for the probe assembly. Moreover, the spherical contact member does not require a costly and complex machining operation.

The spherical contact member 58 may be readily secured at the forward end of the casing 56 in any suitable manner such as by providing an annular support shoulder 60 on the inner surface of the casing 56 and by inwardly turning the forward end of the casing to press fit the spherical contact member 58 in place. Of course, other suitable arrangements can be provided for properly seating and securing the spherical member 58 at the forward end of the casing 56.

A magnet 64 of generally cylindrical configuration and of a size which can be readily received by the tubular casing 56, is suspended from an externally threaded set-screw 65. The set-screw 65 is preferably fabricated of ferrous material such as steel or a steel alloy so as to be releasably attached to the magnet 64 by magnetic attraction. Alternatively, the set-screw 65 can be secured to the magnet 65 in a permanent manner.

The external thread on the set-screw threadably engages the internal thread 62 on the interior of the casing 56 as well as an internal thread 49 at the forward end of the second tubular portion 48 of the indicator rod 38. Thus, the set-screw 65 serves to connect the probe assembly 54 to the forward end of the indicator rod 38.

The end of the set-screw 65 located farthest from the spherical contact member 58 is suitably configured to permit a screwdriver of the like to cooperate therewith in order to rotate and longitudinally adjust the position of the set-screw 65. By rotating the set-screw 65, the position of the magnet 64 relative to the spherical contact member 58 can be varied. The position of the set-screw 65 and the magnet 64 can be adjusted by inserting the screwdriver or other adjustment instrument through the bore 45 in the adjustment screw 44, through the tension spring 42, and through the tubular indicator rod 38.

The magnet 64 utilized in the coating thickness measurement gauge of the present invention differs from magnets used in known gauges in that a portion of the light rare earth element or elements is replaced with one or more heavy rare earth elements. Thus, the magnet of the present invention is fabricated from a combination of one or more light rare earth elements and one or more heavy rare earth elements.

According to a preferred embodiment of the present invention, the magnets are of the $(RE)(TM)_5$ type or the $(RE)_2(TM)_{17}$ where the term (RE) is a combination of light and heavy rare earth elements and the term (TM) is a transition element or elements in the atomic ratios of 1:5 or 2:17. Preferably, the light rare earth elements utilized in fabricating the magnet 64 of the present invention include samarium, praseodymium, neodymium, yttrium, cerium, and lanthanum. The heavy rare earth elements preferably include europium, gadolinium, terbium, dysprosium, holmium, erbium, thulium, ytterbium and lutetium. The transition element can be manganese, iron, cobalt, nickel, or copper.

By way of example, in the 1:5 system mentioned above, the $(RE)(TM)_5$ can be a composition of $(Sm_{0.5}Gd_{0.5})(CO)_5$. By way of further example, variations of that composition can include all compositions between $(Sm_{0.25}Gd_{0.75})(CO)_5$ and $(Sm_{0.75}Gd_{0.25})(CO)_5$.

Similar compositions can also be utilized in the 2:17 system mentioned above. For example, a composition of $(Sm_{1.0}Gd_{1.0})(Co)_{17}$ may be utilized. By way of further example, variations on that composition can include all compositions between $(Sm_{0.5}Gd_{1.5})(Co)_{17}$ and $(Sm_{1.5}Gd_{0.5})(Co)_{17}$, where the $(Co)_{17}$ is nominally $(Co_{0.67}Fe_{0.23}Cu_{0.08}Zr_{0.02})_{17}$.

The foregoing compositions have been given by of example and it is to be understood that the magnet according to the present invention can be fabricated from a composition that includes more than one type of light rare earth element as well as more than one type of heavy rare earth element. Also, compositions other than the 1:5 and 2:17 systems mentioned above may be employed if desired.

It has been found that by replacing a portion of the light rare earth element with a heavy rare earth element to produce a magnet fabricated from a combination of light and heavy rare earth elements, the coating thickness measurement gauge of the present invention is able to accurately measure the thickness of coatings over a wide range of temperatures. In the case of magnets which employ only light rare earth elements, the magnetic strength of the elements can vary by an amount plus or minus 4% per 100° C. change in temperature, thereby resulting in similar variations in the measurements obtained. By utilizing a magnet fabricated from a combination of light and heavy rare earth elements, the variations in magnetic strength with respect to temperature can be greatly reduced and consequently, the accuracy of the measurements greatly increased. Errors which result from the temperature of the substrate being greater than or less than room temperature can be reduced to less than 1% and, in some cases, less than ½% per 100° C. when utilizing a magnet in accordance with the present invention. Moreover, the coating thickness measurement gauge of the present invention permits the accurate measurement of coating thicknesses when the temperature of the substrate is from about −100° C. up to about +300° C.

Figure 6:
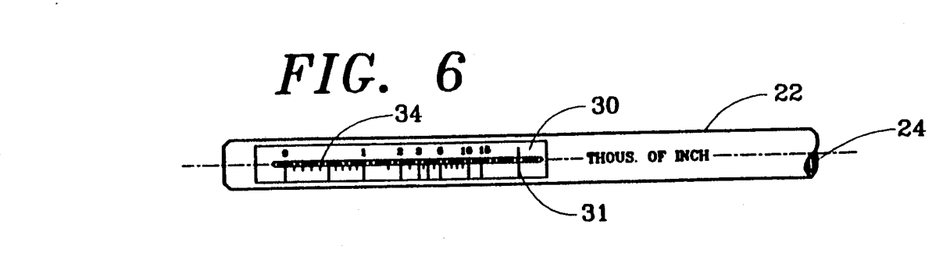
FIG. 6 is a left side view of the housing which forms a part of the gauge according to the present invention.

Turning now to the use and operation of the coating thickness measurement gauge 20 of the present invention, it is first necessary to determine whether the gauge requires calibration. To make that determination, the gauge 20 is held in the horizontal position and the adjustment screw 44 is rotated by way of a screwdriver or other adjustment tool until the first indicating mark 52 comes into alignment with an end line 31 (see FIG. 6) on the measurement scale. The contact member 58 is positioned in engagement with a horizontally oriented calibration surface having a coating of either a known thickness or of no thickness at all. The housing 22 is then slowly pulled away from the calibration surface and at the same time, the first indicating mark 52 is observed through one of the slots 34, 36. The position of the first indicating mark 52 at the point when the contact member 58 moves out of engagement with the calibration surface is noted. If the thickness read on the appropriate measurement scale as indicated by the position of the first indicating mark 52 differs from the known thickness of the coating on the calibration surface, the gauge must be calibrated.

To calibrate the gauge, a screwdriver or other adjustment instrument is inserted from the rear end of the gauge 20, through the bore 45 in the adjustment screw 44, through the tension spring 42, and through the tubular indicator rod 38 in order to rotate the set-screw 65 and adjust the position of the magnet 64 relative to the contact member. If the measured thickness of the coating on the calibration surface as determined from the above-described operation is less than the known thickness, the set-screw 65 is rotated in the manner necessary for moving the magnet 64 away from the contact member 58. On the other hand, if the measured thickness of the coating on the calibration surface is greater than the known thickness, the set-screw 65 is rotated to effect movement of the magnet 64 toward the contact member 58. The foregoing calibration procedure is continued until the measured thickness of the coating on the calibration surface corresponds to the known thickness.

Upon completion of the calibration procedure, the gauge is ready for measuring the thickness of a coating. To measure the thickness of a non-magnetic coating on a ferromagnetic substrate, the gauge 20 is held in the horizontal position and the first indicating mark 52 is brought into alignment with the end line 31 on the measurement scale 30. The contact member 58 is then positioned on the coating to be measured and the housing is slowly pulled away from the coating. If the coating being measured is located on a vertically oriented member so that the gauge 20 is horizontally positioned, the first indicating mark 52 is observed through one of the slots 34, 36 as the housing is pulled away from the coating. When the biasing force of the tension spring 42 overcomes the force of magnetic attraction so that the contact member 58 moves out of engagement with the coating, the position of the first indicating mark 52 is noted. The thickness of the coating can then be read from either measurement scale 30, 32 as indicated by the noted position of the first indicating mark 52.

If the coating whose thickness is being measured is located on a horizontally oriented object which requires the gauge to be positioned vertically with the forward end 51 of the gauge 20 pointing downward, the second indicating mark 68 is observed through one of the slots 34, 36 as the housing 22 is being pulled away from the coating. When the biasing force of the tension spring 42 overcomes the force of magnetic attraction so that the contact member 58 moves out of engagement with the coating, the position of the second indicating mark 68 is noted. The thickness of the coating can then be read from either measurement scale 30, 32 as indicated by the noted position of the second indicating mark 68.

If the coating whose thickness is being measured is located on a horizontally oriented object which requires the gauge to be positioned vertically with the forward end 51 of the gauge 20 pointing upward, the third indicating mark 70 is observed through one of the slots 34, 36 as the housing 22 is being pulled away from the coating. When the biasing force of the tension spring 42 overcomes the magnetic attraction force so that the contact member 58 moves out of engagement with the coating, the position of the third indicating mark 70 is noted. The thickness of the coating can then be read from either measurement scale 30, 32 as indicated by the noted position of the third indicating mark 70.

The coating thickness measurement gauge 20 of the present invention is able to compensate for the affect that gravity has on the operation of the gauge when measuring in different positions due to the presence of the first, second, and third indicating marks 52, 68, 70 on the indicator rod 38. When the gauge 20 is vertically positioned with the forward end 51 directed downward, the force of gravity acts with the magnetic attraction force, thereby requiring a larger force to move the contact member 58 out of engagement with the coating. In the absence of the second indicating mark 68 (i.e., if the thickness were measured with the first indicating mark 52), the measured thickness would be less than the actual thickness of the coating. The gauge of the present invention compensates for that inaccuracy by providing a second indicating mark 68 that is spaced from the first indicating mark 52 in a direction away from the probe assembly 54. The second indicating mark 68 is spaced from the first indicating mark 52 by a distance that corresponds substantially to the additional amount of force that is necessary to move the contact member out of engagement with the coating as a result of the force of gravity. In the gauge according to the present invention, that distance has been determined to be approximately one millimeter. That distance may vary depending upon, for example, the weight of the various parts of the gauge.

When the gauge 20 is vertically positioned with the forward end 51 of the gauge directed upward, the force of gravity acts in opposition to the force of magnetic attraction, thereby requiring a smaller force to move the contact member 58 out of engagement with the coating. In the absence of the third indicating mark 70 (i.e., if the thickness were measured with the first indicating mark 52), the measured thickness would be greater than the actual thickness of the coating. The gauge of the present invention compensates for that inaccuracy by providing a third indicating mark 70 that is spaced from the first indicating mark 52 in a direction toward the probe assembly 54. The third indicating mark 70 is spaced from the first indicating mark 52 by a distance that corresponds substantially to the amount by which the force necessary for moving the contact member out of engagement with the coating is reduced due to the force of gravity. In the gauge of the present invention, that distance has been determined to be approximately one millimeter. As noted above, that distance may vary.

When the gauge is utilized to measure the thickness of a coating on a vertically oriented object so that the gauge is horizontally positioned, the force of gravity has little or no affect on the amount of force necessary to move the contact member out of engagement with the coating and consequently, it is not necessary to compensate for the force of gravity in that situation.

Thus, the first indicating mark 52 can be used to indicate the thickness of the coating.

Although the coating thickness measurement gauge according to the present invention has been described as including the gravity compensating feature in combination with the magnet fabricated from a combination of heavy and light rare earth elements, it is to be understood that those two features can be used independently of one another. Thus, the gravity compensating feature can be employed in a magnetic coating thickness measurement gauge without the magnet described above.

As described above, the indicating marks 52, 68, 70 are located on the indicator rod 38 while the measurement scales 30, 32 are located on the housing 22. It should be apparent that that arrangement could be reversed with the measurement scales 30, 32 being located on the indicator rod 38 and the indicating marks 52, 68, 70 being positioned on the housing 22.

Additionally, it should be understood that the magnet and gravity compensating feature described above can be used in conjunction with coating thickness measurement gauges other than the one described above. However, the use of the magnet of the present invention in a gauge similar to the one described above which only requires a single point contact With the coating does provide an additional advantage above and beyond those noted above. When measuring the thickness of a coating on a hot substrate, it may not be possible to use known types of gauges which have supports or foot pads that rest on the coating surface during the measurement operation (see, for example, U.S. Pat. No. 4,733,178) because such supports or foot pads may not be able to withstand the temperature of the substrate. Because the gauge of the present invention as described above only requires one point engagement of the contact member with the coating, those problems do not arise, regardless of the temperature of the substrate. Thus, the use of a magnet fabricated from a composition of light and heavy rare earth elements in combination with the gauge described above not only produces accurate thickness measurements when the substrate is significantly above room temperature but in addition, permits coating thickness measurements on hot substrates to be obtained without causing damage to the gauge.

The principles, preferred embodiments and modes of operation of the present invention have been described in the foregoing specification. The invention which is intended to be protected herein should not be construed as limited to the particular forms disclosed, since these are to be regarded as illustrative rather than restrictive. Variations and changes may be made and equivalents employed by those skilled in the art without departing from the spirit of the present invention.

What is claimed is:

1. A magnetic coating thickness measurement gauge for measuring the thickness of a coating on a ferromagnetic substrate, comprising:
    a tubular housing having a first end and an oppositely positioned second end, said housing having an interior and a slot which extends along a portion of the length of the housing adjacent the first end, said slot communicating with the interior, said housing having a thickness measurement scale denoting coating thickness which extends along and adjacent said slot;
    an indicator rod movably positioned within the interior of the housing, said indicator rod having a forward end and a rearward end;
    magnet means mounted at the forward end of the indicator rod for providing a magnetic attraction force that urges the indicator rod toward the coating due to the underlying ferromagnetic substrate to bring the magnet means into engagement with the coating;
    spring means operatively associated with the housing and the indicator rod for producing a biasing force in opposition to the force of magnetic attraction;
    first indicating means disposed on the indicator rod and viewable through the slot for indicating, in cooperation with the measurement scale, the thickness of a coating when the force of magnetic attraction is substantially perpendicular to the direction of the force of gravity;
    second indicating means disposed on the indicator rod and viewable through the slot for indicating, in cooperation with the measurement scale, the thickness of a coating when the force of magnetic attraction is substantially parallel to and in the same direction as the force of gravity; and
    third indicating means disposed on the indicator rod and viewable through the slot for indicating, in cooperation with the measurement scale, the thickness of a coating when the force of magnetic attraction is substantially parallel to and in the direction opposite to the force of gravity.

2. The gauge according to claim 1, wherein said first indicating means includes a first indicating mark on the indicator rod, said second indicating means includes a second indicating mark on the indicator rod, said second indicating mark being differentiable from the first indicating mark and being spaced from said first indicating mark in a direction away from said magnet means, said third indicating means including a third indicating mark on the indicator rod that is spaced from said first indicating mark in a direction toward said magnet means.

3. The gauge according to claim 2, wherein said spring means is a tension spring having one end that is mounted on a spring mounting member, said spring mounting member being connected to the rearward end of the indicator rod.

4. The gauge according to claim 3, wherein an opposite end of the tension spring is mounted on an adjustment screw for adjusting the position of the indicator rod within the housing, said adjustment screw having a threaded outer peripheral surface that engages an interiorly threaded portion on the interior of the housing adjacent a second end of the housing which is opposite the first end.

5. The gauge according to claim 4, wherein said magnet means is connected to an externally threaded mounting screw, the external thread on the mounting screw being threadably engaged with an internally threaded portion at the forward end of the indicator rod, and including a holding member having a spherically shaped ferromagnetic contact member mounted at a forward end thereof, a rearward end of the holding member being internally threaded and threadably engaging the external thread on the mounting screw so that the holding member is connected to the forward end of the indicator rod and so that the magnet is positioned within the holding member.

6. The gauge according to claim 5, wherein said adjustment screw and said indicator rod have a bore extending therethrough for permitting access to the mounting screw from the second end of the housing in order to adjust the position of the magnet relative to the spherical contact member.

7. A gauge for measuring the thickness of a coating on a ferromagnetic substrate, comprising:

a housing having an interior;

a rod movably positioned within the interior of the housing;

probe means mounted on said rod for providing a magnetic attraction force that urges the rod toward the coating as a result of the underlying ferromagnetic substrate in order to bring the probe means into engagement with the coating;

spring means operatively associated with said rod for providing a biasing force in opposition to the magnetic attraction force;

scale means in the form of numerical indicia provided on the housing for denoting coating thickness based upon the amount of movement of the rod; and indicating means provided on the rod and cooperating with the scale means for indicating the thickness of the coating and for compensating for the affect that gravity has on the amount of force necessary to move the probe means out of engagement with the coating.

8. The gauge according to claim 7, wherein said probe means is mounted at a forward end of the rod and said spring means is connected to a rearward end of the rod.

9. The gauge according to claim 7, wherein said probe means includes a magnet fabricated from a combination of at least one light rare earth element and at least one heavy rare earth element, wherein the at least one heavy rare earth element has an atomic number of at least sixty-three and the at least one light rare earth element has an atomic number less than sixty-three.

10. The gauge according to claim 7, wherein said housing includes at least one slot that communicates with the interior of the housing, said scale means extending along and adjacent the slot.

11. A gauge for measuring the thickness at a coating on a ferromagnetic substrate, comprising:

a housing having an interior;

a rod movably positioned within the interior of the housing;

probe means mounted on said rod for providing a magnetic attraction force that urges the rod toward the coating as a result of the underlying ferromagnetic substrate in order to bring the probe means into engagement with the coating;

spring means operatively associated with said rod for providing a biasing force in opposition to the magnetic attraction force;

scale means in the form of numerical indicia provided on the housing for denoting coating thickness based upon the amount of movement of the rod; and indicating means provided on the rod and cooperating with the scale means for indicating the thickness of the coating and for compensating for the affect that gravity has on the amount of force necessary to move the probe means out of engagement with the coating, said indicating means including at least two spaced apart and differentiable marks, one of which indicates, in cooperation with the scale means, the thickness of the coating when the magnetic attraction force is substantially parallel to and opposite the force of gravity, and the other of which indicates, in cooperation with the scale means, the thickness of the coating when the magnetic attraction force is substantially parallel to and in the same direction as the force of gravity.

12. The gauge according to claim 11, wherein said indicating means includes an additional mark that is spaced from and situated between the two spaced apart marks for indicating, in cooperation with the scale means, the thickness of the coating when the magnetic attraction force is substantially perpendicular to the force of gravity.

13. The gauge according to claim 12, wherein all of said marks are located on the rod.

14. A gauge for measuring the thickness of a coating on a ferromagnetic substrate, comprising:

a housing having an interior;

a rod movably positioned within the interior of the housing;

probe means mounted on said rod for providing a magnetic attraction force that urges the rod toward the coating as a result of the underlying ferromagnetic substrate in order to bring the probe means into engagement with the coating, said probe means including a magnet and a spherical ferromagnetic contact member mounted at a forward end of a holding member, said magnet being secured to an externally threaded mounting screw which threadably engages an interiorly threaded portion at a rearward end of the holding member, said exteriorly threaded mounting screw also threadably engaging an internally threaded portion at a forward end of the rod;

spring means operatively associated with said rod for providing a biasing force in opposition to the magnetic attraction force;

scale means in the form of numerical indicia provided on the housing for denoting coating thickness based upon the amount of movement of the rod; and indicating means provided on the rod and cooperating with the scale means for indicating the thickness of the coating and for compensating for the affect that gravity has on the amount of force necessary to move the probe means out of engagement with the coating.

15. A gauge for determining the thickness of a coating on a ferromagnetic substrate comprising:

a housing having an interior;

a rod movably positioned within the interior of the housing;

a magnet mounted on one end of the rod for providing a magnetic attraction force urging the rod toward the coating due to the underlying ferromagnetic substrate, said magnet being fabricated from a combination of at least one light rare earth element and at least one heavy rare earth element, said light rare earth element and said heavy rare earth element being different elements; and spring means operatively associated with the housing and the rod for providing a biasing force in opposition to said magnetic attraction force.

16. The gauge according to claim 15, wherein the at least one heavy rare earth element is an element selected from the group consisting of lutetium, ytterbium, thulium, erbium, holmium, dysprosium, terbium, gadolinium, and europium.

17. The gauge according to claim 16, wherein the at least one light rare earth element is an element selected from the group consisting of lanthanum, cerium, praseodymium, neodymium, promethium, and samarium.

18. The gauge according to claim 15, including a probe assembly in which is mounted the magnet, the magnetic attraction force urging the probe assembly into engagement with the coating, and including scale means for denoting coating thickness based upon the amount of movement of the rod and indicating means cooperating with the scale means for indicating the thickness of the coating while also compensating for the affect that the force of gravity has on the amount of force necessary for moving the probe assembly out of engagement with the coating.

19. The gauge according to claim 15, wherein said magnet is fabricated from a combination of more than one heavy rare earth element and more than one light rare earth element.

20. A gauge for measuring the thickness of a coating on a ferromagnetic substrate, comprising: a housing having an interior, a rod movably positioned within the interior of the housing, probe means mounted at a forward end of the rod for providing a magnetic attraction force that urges the rod towards the coating due to the presence of the underlying ferromagnetic substrate, a spring operatively associated with the housing and the rod for providing a biasing force in opposition to the magnetic attraction force, scale means in the form of numerical indicia provided on said housing for denoting coating thickness based upon the amount of movement of the rod relative to the housing, and indicating means provided on the rod for indicating, in cooperation with the scale means, the thickness of the coating, said probe means including a magnetic member of the $(RE)(TM)_5$ type, wherein RE is a combination of at least one light rare earth element and at least one heavy rare earth element, and TM is a transition element, said at least one light rare earth element being different from said at least one heavy rare earth element.

21. The gauge according to claim 20, wherein the at least one heavy rare earth element has an atomic number of at least sixty-three and the at least one light rare earth element has an atomic number of less than sixty-three.

22. The gauge according to claim 20, wherein the at least one heavy rare earth element is an element selected from the group consisting of lutetium, yrterbium, thulium, erbium, holmium, dysprosium, terbium, gadolinium, and europium.

23. The gauge according to claim 20, wherein said housing is an elongated tubular member and said rod is movable in a direction substantially parallel to the longitudinal axis of the tubular member, the biasing force of the spring also being substantially parallel to the longitudinal axis of the tubular member.

24. The gauge according to claim 23, wherein said tubular member has a slot extending along a portion thereof that communicates with the interior thereof, said scale means including a measurement scale positioned adjacent to and extending along the length of the slot, said indicating means including at least one mark on the rod that is visible through the slot during use of the gauge.

25. A gauge for measuring the thickness of a coating overlying a ferromagnetic substrate, comprising: a housing having an interior, a rod movably positioned within the interior of the housing, probe means mounted on the rod for producing a magnetic attraction force that urges the rod to move toward the coating due to the presence of the underlying ferromagnetic substrate and that causes movement of the rod, a spring operatively associated with the housing and the rod for providing a biasing force in opposition to the magnetic force of attraction, scale means in the form of numerical indicia provided on said housing for denoting coating thickness based upon the amount of movement of the rod, and indicating means provided on said rod for indicating, in cooperation with the scale means, the thickness of the coating, said probe means including a magnetic member of the $(RE)_2(TM)_{17}$ type, where RE is a material that includes a combination of at least one light rare earth element and at least one heavy rare earth element, and TM is one or more transition elements, said at least one light rare earth element and said at least one heavy rare earth element being different.

26. The gauge according to claim 25, wherein said at least one heavy rare earth element is an element selected from the group consisting of lutetium, ytterbium, thulium, erbium, holmium, dysprosium, terbium, gadolinium, and europium.

27. The gauge according to claim 26, wherein the at least one light rare earth element is an element selected from the group consisting of lanthanum, cerium, praseodymium, neodymium, promethium, and samarium.

28. A method of measuring the thickness of a coating on a ferromagnetic substrate through use of a gauge which includes a housing having an interior and an opening, a rod movably positioned within the interior of the housing, probe means mounted on a forward end of the rod and adapted to extend through the opening in the housing for producing a magnetic attraction force that urges the rod toward the coating due to the presence of the underlying ferromagnetic substrate, a spring operatively associated with the housing and the rod for providing a biasing force in opposition to the magnetic attraction force, scale means in the form of numerical indicia provided on the housing for denoting coating thickness based upon the amount of movement of the rod relative to the housing, and indicating means provided on said rod for indicating, in cooperation with the scale means, the thickness of the coating, said indicating means including first, second and third differentiable indicating marks, and the method comprising the steps of:

bringing the probe means into engagement with the coating;

pulling the housing away from the coating until the probe means moves out of engagement with the coating;

determining the thickness of the coating by reading, at the point when the probe means moves out of engagement with the coating, the thickness on the scale means aligned with 1) the first indicating mark if the force of magnetic attraction is substantially perpendicular to the direction of the force of gravity, 2) the second indicating mark if the force of magnetic attraction is substantially parallel to and in the direction of the force of gravity, or 3) the third indicating mark if the force of magnetic attraction is substantially parallel to and in a direction opposite the direction of the force of gravity.

* * * * *

UNITED STATES PATENT AND TRADEMARK OFFICE
CERTIFICATE OF CORRECTION

PATENT NO. : 5,094,009
DATED : March 10, 1992
INVENTOR(S) : Frank J. KOCH et al.

It is certified that error appears in the above-identified patent and that said Letters Patent is hereby corrected as shown below:

Column 7, line 4: change "horizontally" to --vertically--.

Signed and Sealed this

Thirteenth Day of July, 1993

Attest:

MICHAEL K. KIRK

Attesting Officer   Acting Commissioner of Patents and Trademarks